Jan. 27, 1942. G. MONNET 2,271,377
METHOD OF AND APPARATUS FOR TEMPERING GLASS
Filed July 19, 1938 2 Sheets-Sheet 1
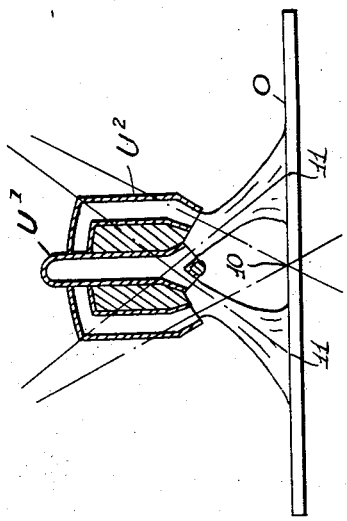
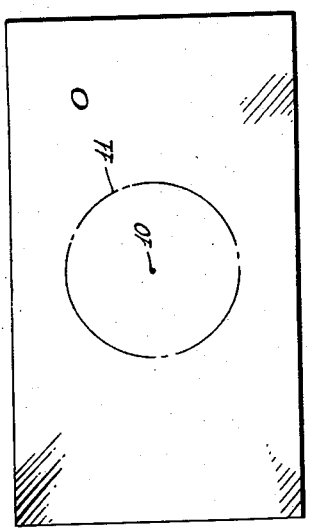
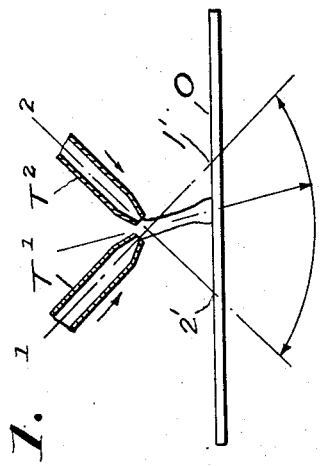
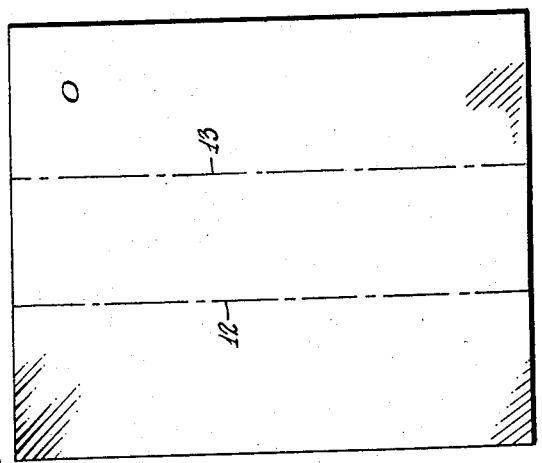
Inventor
GEORGES MONNET
By Dorsey, Cole & Garner
Attorneys Jan. 27, 1942.   G. MONNET   2,271,377
METHOD OF AND APPARATUS FOR TEMPERING GLASS
Filed July 19, 1938   2 Sheets-Sheet 2
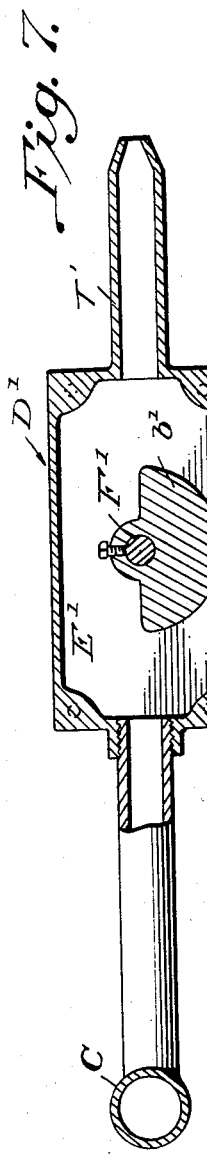
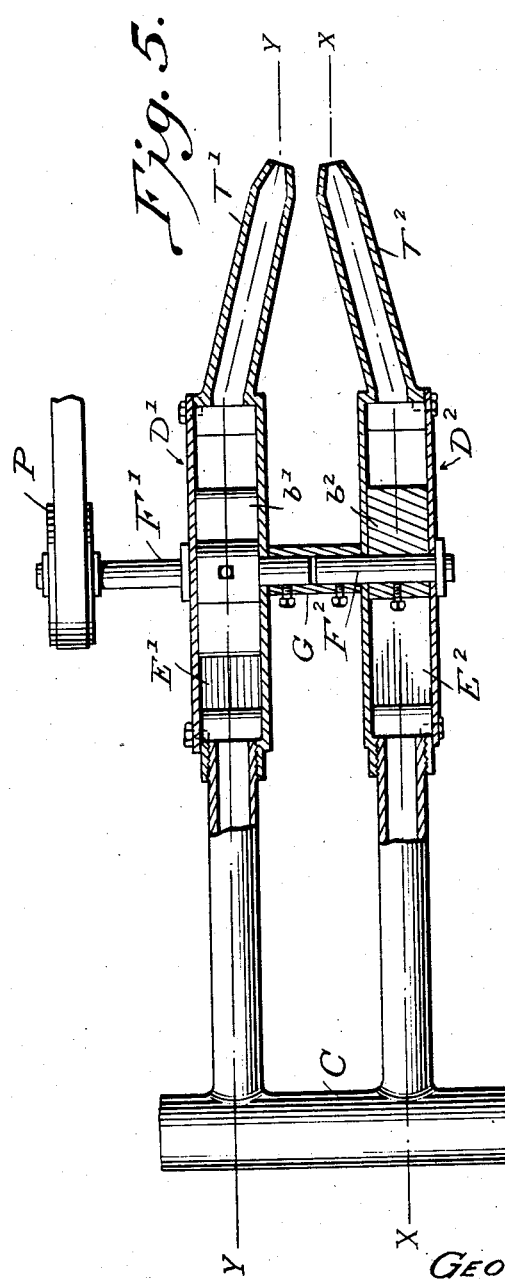
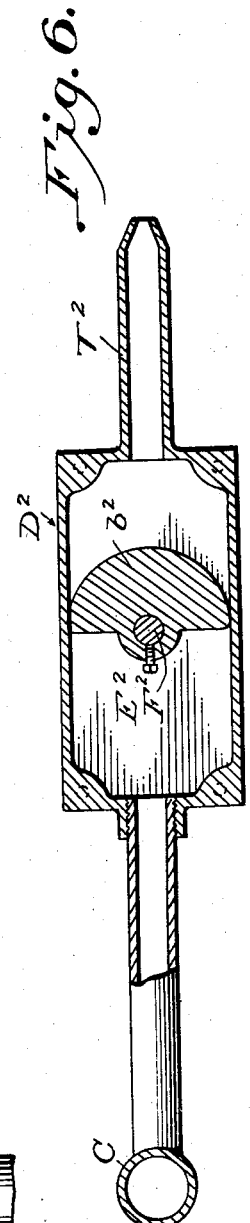
Inventor
GEORGES MONNET
By Dorsey, Cole & Garner
Attorneys Patented Jan. 27, 1942

2,271,377

UNITED STATES PATENT OFFICE 2,271,377

METHOD OF AND APPARATUS FOR TEMPERING GLASS

Georges Monnet, Paris, France, assignor to The American Securit Company, Washington, D. C., a corporation of Delaware Application July 19, 1938, Serial No. 220,063
In France July 27, 1937

14 Claims. (Cl. 49—45)

The usual method of tempering glass comprehends broadly, the rapid chilling of a glass sheet or other object which has been heated to or maintained at a temperature approximating that of its softening point in such a manner that the surfaces of the glass sheet or object are under compression and the interior portions thereof are under tension.

The present invention relates to a method of and apparatus for applying to the surface or surfaces of a glass sheet or object a cooling or chilling medium in the form of a gaseous or liquid jet or jets, or a combination of both, for the purpose of tempering the same.

It is well known that if in this method of cooling the zone of action of each jet on the surface of the object is immovable it tends to produce on the object a chilling in zones which are more or less differentiated from each other which are exemplified by birefringent or iridescent spots formed on the surface of the objects.

It is, therefore, desirable in many instances to produce a relative motion between the object to be tempered and the cooling medium so as to produce uniformity, insofar as possible, in the stresses set up during the tempering operation and this has been accomplished in some cases by moving the cooling jets in respect to the sheet and in other cases by moving the sheet maintaining the cooling jets stationary. In the former case complicated driving and control mechanism is required and in the latter case great care must be taken in moving the sheet to prevent distortion or misshaping thereof.

It is an object of the present invention to avoid the difficulties attendant upon the operations just recited and to this end it comprehends the utilization of a movable jet issuing from a fixed or stationary source of supply. This jet is movable in respect to the object undergoing chilling and its formation and application is such that it may be varied in direction or in direction and magnitude simultaneously according to the particular nature of the chilling operation desired. The arrangement of the system is such that the zone of action of a jet or jets is automatically varied without the necessity of moving the nozzles from which the cooling medium is discharged.

In the embodiment herein disclosed the movable jet may be composed of two or more elementary jets issuing from as many nozzles, each of these constituent jets being variable in the function of the time according to a law selected for each of them. The coordinated selection of these different laws, the arrangement, and the form of the nozzles are such that the vector which defines the velocity of the fluid in the jet varies in direction or direction and magnitude simultaneously. The present method and apparatus, therefore, permits the production of a tempered glass object free or substantially free from birefringent or iridescent spots which may seriously affect its esthetic appeal or optical qualities. The nozzle openings may take a variety of shapes for example rectilinear, circular, curved, sinuous or otherwise, but in any event the movement of the impinging jet, while variable, is not impaired.

A detail description of the invention will hereinafter appear and reference made to the accompanying drawings, in which:

Figure 1 illustrates diagrammatically an apparatus for producing a movable jet issuing from two fixed nozzles.

Figure 2 illustrates an embodiment in which annular nozzles are coaxial.

Figure 3 is a plan view showing the variable zone of impact by the jet produced by the arrangement of Figure 2.

Figure 4 is a plan view illustrating the variable zone of impact of the jet when utilizing rectilinear slots in the arrangement of Figure 1.

Figures 5, 6 and 7 illustrate diagrammatically nozzles and associated parts for controlling the variation in intensity of the elementary jets.

The apparatus shown in Fig. 1 comprises two associated nozzles $T^1$—$T^2$, the axes $I$—$I'$ and $2$—$2'$ of which are inclined toward each other and the openings of which are adjacent.

The feed of cooling or chilling fluid in each nozzle is regulated so as to be varied, for example according to a law of sinusoidal direction, starting from a minimum and returning to this minimum, after having passed through a maximum, but the two feeds are dephased or alternated during the time, so that the maximum feed for one nozzle is concomitant with the minimum feed for the other and vice versa.

The resulting jet then oscillates on the object treated—which in the present case is a flat glass plate 0, for example one to be cooled for tempering—between the extreme impact centres $I'$ and $2'$, which correspond to the maximum feeds of each of the nozzles $T^1$—$T^2$.

According to Figs. 2 and 3, the chilling device comprises two cylindrical, co-axial nozzles $U^1$—$U^2$, one of which, $U^1$, giving a divergent jet, and the other, $U^2$, of annular cross section, a convergent jet. A fluid the feed of which varies periodically, with a dephase or alternation of a half period from one nozzle to the other, is passed into these nozzles.

The resulting movable jet then assumes a conical form, that is, its zone of impact on the flat object O, moves, starting from a center 10 representing theoretically the action of the single nozzle $U^2$ and moves outwardly toward a limiting annular center line 11 which corresponds theoretically to the action of the single nozzle $U^1$. Of course, the cooling area is effective in a harmonic variation between the center 10 and the area beyond the center line 11 as indicated in Fig. 2.

It is apparent that the invention may be practiced by means of various, widely differing apparatus, either as to the number of nozzles or the form of their discharge openings, which may vary in each application without departing from the scope of the invention.

For example, the openings may be orifices, circular or not, rectilinear, circular, sinuous or otherwise suitably formed slots or ports.

Fig. 4 shows at lines 12 and 13 the center lines of the jets acting upon the plate O between the limiting positions of effectiveness of nozzles $T^1$ and $T^2$, that is, center line 12 corresponds theoretically to the action of the single nozzle $T^2$ while center line 13 corresponds theoretically to the action of the single nozzle $T^1$. The movable impact zone produced on plate O travels between and slightly beyond the center lines 12 and 13 in a harmonic movement, where the nozzles $T^1$—$T^2$ of Fig. 1 are provided with rectilinear openings through which the jets pass in the form of fluid sheets.

The variation of the respective feeds of the elementary jets, in function of the time, is produced by any adequate means, for example by means of distributors or the like interposed in the passages branching from a common collector, itself connected with a source of compressed fluid.

By way of example, Fig. 5 shows a simple distributor system for assuring periodical variations of feed in two connected nozzles of the type described.

Figs. 6 and 7 respectively show sections on X—X and Y—Y of Fig. 5.

The nozzles $T^1$—$T^2$ are connected respectively to two distributors $D^1$—$D^2$, themselves connected with a common collector C, which may serve for a nozzle system comprising any number of coupled nozzles.

The distributors $D^1$—$D^2$ are provided with chambers $E^1$—$E^2$ in which valves or keys $b^1$—$b^2$ may turn. These keys may be mounted on a plurality of shafts $F^1$—$F^2$ united together by the adjusting coupling G so that the shafts with their corresponding keys may be adjusted to different angles in respect to each other. Instead of this adjusting arrangement a single shaft may be employed for the several keys and these may be shifted to occupy positions inclined at 90° with respect to each other on the shaft. In either type of arrangement the shaft or shafts may be driven by the pulley P connected to a suitable source of power.

In all applications the law of feed variation for each elementary jet is selected so as to produce, in the resulting jet the desired variations of velocity, in direction or size; the realizations are thus of indefinite number, as they depend, among other factors, on the selection of these laws.

For example, they may be selected so that the feed of the resultant jet is greater when the jet strikes the surface to be treated at a slight angle, or in a larger zone.

It is also possible, for example, to compensate for each unit of surface, wherein the jet may lose effectiveness, either by striking the surface at a more grazing angle of incidence or by being spread out on this surface to a greater degree.

What is claimed is:

1. Apparatus of the type described, comprising a plurality of nozzles having their axes inclined toward each other and their openings adjacent, a chamber associated with each of said nozzles, a valve or key located within each chamber and fixed in dephased relation in respect to each other to control the movement of cooling fluid in each nozzle, means for rotating said valves in synchronism and means for admitting cooling fluid to said chambers and nozzles.

2. The method of tempering glass sheets or other glass articles which consists in combining two or more elementary jets of chilling fluid into a resultant jet directed upon the surface of a glass sheet or article previously heated to approximately its softening point and moving the resultant jet upon the surface of the glass sheet or article by varying the intensity of feed of each constituent jet.

3. The method of tempering glass sheets or other glass articles which consists in combining two or more elementary jets of chilling fluid into a resultant jet directed upon the surface of a glass sheet or article previously heated to approximately its softening point and moving continuously the resultant jet upon the surface of the glass sheet or article by varying the intensity of feed of each constituent jet.

4. The method of tempering glass sheets or other glass articles which consists in combining two or more elementary jets of chilling fluid into a resultant jet directed upon the surface of a glass sheet or article previously heated to approximately its softening point and oscillating the resultant jet upon the surface of the glass sheet or article by varying the intensity of feed of each constituent jet.

5. The method of tempering glass sheets or other glass articles which consists in combining two or more elementary jets of chilling fluid into a resultant jet directed upon the surface of a glass sheet or article previously heated to approximately its softening point and moving continuously the resultant jet upon the surface of the glass sheet or article by varying in a predetermined order and time the intensity of feed of each constituent jet.

6. The method of tempering glass sheets or other glass articles which consists in combining two or more elementary jets of chilling fluid issuing from fixed nozzles into a resultant jet directed upon the surface of a glass sheet or article previously heated to approximately its softening point and moving the resultant jet upon the surface of the glass sheet or article by cyclically varying the feed of each constituent jet.

7. The method of tempering sheets or other glass articles which consists in combining two or more elementary jets of chilling fluid into a resultant jet directed against and movable upon the surface of a glass sheet or article previously heated to approximately its softening point and cyclically varying the intensity of the chilling fluid from each jet so that the intensity of the resultant jet is greater when striking the glass at an angle to the normal of the surface of the glass than when normal to said surface.

8. The method of tempering sheets or other glass articles which consists in combining two or more elementary jets of chilling fluid into a resultant jet directed upon the surface of a glass sheet or article previously heated to approximately its softening point, moving the resultant jet of chilling fluid upon the surface of the glass through varying degrees of inclination in respect to the surface of the glass and increasing the intensity of the resultant jet to compensate for the lesser cooling effect as the angle of the jet decreases in respect to the surface of the glass by cyclically varying the intensity of the chilling fluid from each jet.

9. In apparatus for tempering glass sheets or other glass articles, means for directing and controlling the direction of a jet of chilling fluid upon the surface of a glass sheet or other glass article previously heated to approximately its softening point comprising a plurality of converging nozzles, the jets from which meet and unite to form a resultant jet, and means for continuously and cyclically varying the pressure and velocity of the supply of chilling fluid through the respective nozzles with a phase displacement therebetween whereby the resultant jet is caused to travel upon the surface of the glass to chill the same throughout the effective range of the jet.

10. In apparatus for tempering glass sheets or other glass articles, means for directing and controlling the direction of a jet of chilling fluid upon the surface of a glass sheet or other glass article previously heated to approximately its softening point comprising a plurality of converging nozzles, the jets from which meet and unite to form a resultant jet, and means for varying in a predetermined order and time the relative intensity of the supply of chilling fluid through the respective nozzles and thereby vary the characteristics of the resultant jet.

11. In apparatus for tempering glass sheets or other glass articles, means for directing and controlling the direction of a jet of chilling fluid upon the surface of a glass sheet or other glass article previously heated to approximately its softening point comprising a plurality of converging nozzles, the jets from which meet and unite to form a resultant jet, and means for varying continuously the relative intensity of the supply of chilling fluid through the respective nozzles and thereby vary continuously the characteristics of the resultant jet.

12. In apparatus for tempering glass sheets or other glass articles, means for directing and controlling the direction of a jet of chilling fluid upon the surface of a glass sheet or other glass article previously heated to approximately its softening point comprising a plurality of converging nozzles, the jets from which meet and unite to form a resultant jet, and means for alternately varying the pressure and velocity of the supply of chilling fluid in each nozzle according to a law of sinusoidal direction to each nozzle and thereby cause the resultant jet to travel upon the surface of the glass.

13. In apparatus for tempering glass sheets or other glass articles, the combination of a source of chilling fluid under pressure, a plurality of nozzles connected to said source and arranged to convert their constituent jets into a resultant jet directed upon the surface of a glass sheet or other article previously heated to approximately its softening point, means individual to each nozzle controlling the intensity of the chilling jet emitted therefrom, and an adjustable connection between the control means for each nozzle for varying relatively the intensity of each jet and thereby varying the direction of the resultant jet.

14. In apparatus for tempering glass sheets or other glass articles, the combination of a source of chilling fluid under pressure, a pair of concentric nozzles producing convergent and divergent jets uniting into a resultant jet directed upon the surface of the glass sheet or other glass article previously heated to approximately its softening point, and means for varying in a predetermined order and time the relative intensity of the supply of the chilling fluid through the respective nozzles to produce a travel of the resultant jet on the surface of the glass to be tempered.

GEORGES MONNET.